United States Patent
Jo et al.

(10) Patent No.: US 9,964,690 B2
(45) Date of Patent: May 8, 2018

(54) HEAT DISSIPATING CASE FOR LIQUID CRYSTAL DISPLAY PANEL

(71) Applicant: STI Co., Ltd., Anseong-si, Gyeonggi-do (KR)

(72) Inventors: Myung Dong Jo, Anseong-si (KR); Kwang Hwan Kim, Anseong-si (KR)

(73) Assignee: STI CO., LTD., Anseong-si, Gyeonggi-do (KR)

( * ) Notice: Subject to any disclaimer, the term of this patent is extended or adjusted under 35 U.S.C. 154(b) by 32 days.

(21) Appl. No.: 15/064,063

(22) Filed: Mar. 8, 2016

(65) Prior Publication Data

US 2017/0168226 A1 Jun. 15, 2017

(30) Foreign Application Priority Data

Dec. 10, 2015 (KR) .................. 10-2015-0175959

(51) Int. Cl.
*F21V 8/00* (2006.01)
*G02F 1/1333* (2006.01)

(52) U.S. Cl.
CPC ......... *G02B 6/0085* (2013.01); *G02B 6/0073* (2013.01); *G02F 1/133308* (2013.01); *G02F 1/133385* (2013.01); *G02F 2001/133314* (2013.01)

(58) Field of Classification Search
CPC .. G02B 6/0085; G02B 6/0073; G02B 6/4269; G02F 1/133308; G02F 1/133382
See application file for complete search history.

(56) References Cited

U.S. PATENT DOCUMENTS

| | | | | |
|---|---|---|---|---|
| 2010/0188607 | A1* | 7/2010 | Park | G02B 6/0073 349/62 |
| 2011/0199733 | A1* | 8/2011 | Hirabayashi | G02F 1/133382 361/707 |
| 2012/0249923 | A1* | 10/2012 | Kono | G02B 6/0055 349/62 |
| 2015/0257312 | A1* | 9/2015 | Tokuyama | H05K 7/20963 349/58 |
| 2016/0131831 | A1* | 5/2016 | Tomomasa | G02B 6/0031 348/790 |
| 2016/0266299 | A1* | 9/2016 | Yoon | G02F 1/133617 |
| 2017/0059769 | A1* | 3/2017 | Ma | G02F 1/1333 |

FOREIGN PATENT DOCUMENTS

| | | |
|---|---|---|
| JP | 2013-143191 A | 7/2013 |
| KR | 20-0401354 Y1 | 11/2005 |
| KR | 10-2011-0039845 A | 4/2011 |
| KR | 10-1102738 B1 | 1/2012 |
| KR | 10-2012-0075044 A | 7/2012 |

* cited by examiner

*Primary Examiner* — Michael Caley
*Assistant Examiner* — Mariam Qureshi
(74) *Attorney, Agent, or Firm* — Rabin & Berdo, P.C.

(57) ABSTRACT

A heat dissipating case for a liquid crystal display panel includes: a case provided with a space part therein and provided with a liquid crystal panel mounted to an upper surface of the case; a heat sink chassis mounting hole formed through a lower surface of the case, wherein a heat sink chassis is fitted into the heat sink chassis mounting hole; a base chassis provided on a lower part of the space part, the base chassis being provided with: an LED module attaching member mounted thereto; and the heat sink chassis mounted to a lower surface thereof; and an upper protruding part formed by protruding from an upper surface of the base chassis.

2 Claims, 2 Drawing Sheets

HEAT DISSIPATING CASE FOR LIQUID CRYSTAL DISPLAY PANEL

CROSS REFERENCE TO RELATED APPLICATION

The present application claims priority to Korean Patent Application No. 10-2015-0175959, filed Dec. 10, 2015, the entire contents of which is incorporated herein for all purposes by this reference.

BACKGROUND OF THE INVENTION

Field of the Invention

The present invention generally relates to a heat dissipating case for a liquid crystal display panel. More particularly, the present invention relates to a heat dissipating case for a liquid crystal display panel, whereby the heat dissipating case effectively dissipates heat generated from a light source of a backlight unit, and prevents other constituting parts from being damaged by a light guide panel expanded due to the heat generated from the light source under the condition of high temperature and humidity in the case.

Description of the Related Art

Generally, according to a configuration of a conventional backlight unit, as shown in FIG. 4, the conventional backlight unit includes: a case 104 provided with a space part 100 therein and provided with a liquid crystal panel 102 mounted to an upper surface of the case; a base chassis 110 provided on a lower part of the space part 100 in the case 104, the base chassis 110 having an LED module attaching member 108 mounted thereto, wherein the base chassis 110 dissipates heat of an LED module 106 transferred via the LED module attaching member 108 in such a manner that the LED module 106 emitting light is mounted to the LED module attaching member 108 while the LED module attaching member 108 horizontally lies and vertically stands at an end thereof; a light guide panel 112 made of a transparent acrylic panel and provided on the base chassis 110 by being laminated thereon, the light guide panel evenly distributing light on an entire area of the liquid crystal panel 102 after absorbing the light emitted by the LED module 106; and an optical sheet member 114 provided between the liquid crystal panel 102 and the light guide panel 112 by being laminated therebetween, wherein the optical sheet member 114 increases luminance in such a manner that the optical sheet member 114 refracts and condenses light while evenly distributing the light escaping from a surface of the light guide panel 112 on an entire surface of the light guide panel 112.

The conventional backlight unit having the above-mentioned configuration dissipates heat generated from the LED module via the LED module attaching member 108, the base chassis 110, and the case 104.

However, according to the configuration of the conventional backlight unit, heat of the LED module 106 transferred to the light guide panel 112 via the base chassis 110 under a condition of high temperature and humidity in the case 104 expands the light guide panel 112, and accordingly, the case 104 is expanded or swollen, and further the LED module 106 may be damaged by an expanded light guide panel 112.

Meanwhile, there is a heat sink module presented in Korean Patent No. 10-1102738 as a prior art of the present invention, wherein the heat sink module includes: a circuit board to which parts are mounted; a heat sink dissipating heat generated from the parts in such a manner that some of surfaces of the heat sink are in contact with the circuit board, and the rest of the surfaces of the heat sink are spaced apart from the circuit board; and a lug fixing the heat sink to the circuit board.

In addition, the heat sink in contact with the circuit board is provided with a space through which heat is dissipated.

The foregoing is intended merely to aid in the understanding of the background of the present invention, and is not intended to mean that the present invention falls within the purview of the related art that is already known to those skilled in the art.

DOCUMENTS OF RELATED ART (Patent Document 1) Korean Utility Model No. 20-0401354 (Nov. 11, 2015)
(Patent Document 2) Korean Patent No. 10-1102738 (Jan. 5, 2012)

SUMMARY OF THE INVENTION

Accordingly, the present invention has been made keeping in mind the above problems occurring in the related art, and the present invention is intended to propose a heat dissipating case for a liquid crystal display panel, whereby the heat dissipating case prevents other constituting parts from being expanded by a light guide panel expanded due to heat generated from a light source of a backlight unit under a condition of high temperature and humidity in the case, or prevents the light source from being damaged by the expanded light guide panel.

In order to achieve the above object, according to one aspect of the present invention, there is provided a heat dissipating case for a liquid crystal display panel, the heat dissipating case including: a case provided with a space part therein and provided with a liquid crystal panel mounted to an upper surface of the case; a heat sink chassis mounting hole formed through a lower surface of the case, wherein a heat sink chassis is fitted into the heat sink chassis mounting hole, the heat sink chassis dissipating heat to an outside after absorbing the heat transferred from an LED module that emits light; a base chassis provided on a lower part of the space part in the case and dissipating the heat generated by the LED module to the outside through the case, the base chassis being provided with: an LED module attaching member mounted thereto, wherein while the LED module attaching member horizontally lies and vertically stands at an end thereof, a first side of the LED module attaching member standing vertically is in contact with an inner side of the case, and the LED module emitting the light is mounted on a second side of the LED module attaching member standing vertically; and the heat sink chassis mounted to a lower surface of the base chassis, wherein the heat sink chassis dissipates the heat of the LED module transferred via the LED module attaching member to the outside; and an upper protruding part formed by protruding from an upper surface of the base chassis in a direction toward an upper part of the base chassis, the upper protruding part minimizing the quantity of heat transferred to a light guide panel from the base chassis by minimizing an area in contact with the light guide panel when the light guide panel evenly distributing light emitted from the LED module on an entire area of the liquid crystal panel is provided on the base chassis, and an optical sheet member increasing luminance in such a manner that the optical sheet member evenly distributes light on an entire surface of the light guide panel by diffusing the light escaping from a surface of the light guide panel, and refracts and condenses the light is provided on the light guide panel by being laminated on the light guide panel, and wherein the heat generated from the LED module is dissipated to the outside via the heat sink chassis exposed outside the case, wherein the base chassis dissipates the heat transferred from the LED module to the outside through the case, and wherein the upper protruding part minimizes the quantity of heat of the LED module transferred to the light guide panel by minimizing the area in contact with the light guide panel.

The heat dissipating case of the liquid crystal display panel having the above-mentioned configuration according to the present invention can dissipate the heat of the LED module transferred to the base chassis or the LED module attaching member to the outside via the heat sink chassis exposed outside the case.

In addition, the heat dissipating case minimizes structure modification of the light guide panel that may be caused by the heat of the LED module under a condition of high temperature and humidity in the case in such a manner that the heat dissipating case allows the upper protruding part protruding in the direction toward the upper part of the base chassis to minimize the quantity of the heat of the LED module transferred to the light guide panel by minimizing the area in contact with the light guide panel.

Furthermore, the liquid crystal display is prevented from being expanded or swollen by the horizontally extended light guide panel, and further the LED module is prevented from being damaged thereby in such a manner that when the light guide panel extends in a horizontal direction, a center of a lower surface of the light guide panel is bent into an arc shape by configuring upper protruding parts arranged on a most outer part of the base chassis so as to be arranged higher than upper protruding parts arranged on inner parts of the base chassis.

Accordingly, according to the present invention, the heat dissipating case of the liquid crystal display panel can prevent all parts from being expanded or the LED module from being damaged by the light guide panel expanded due to heat transferred from the LED module under the condition of high temperature and humidity in the case.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
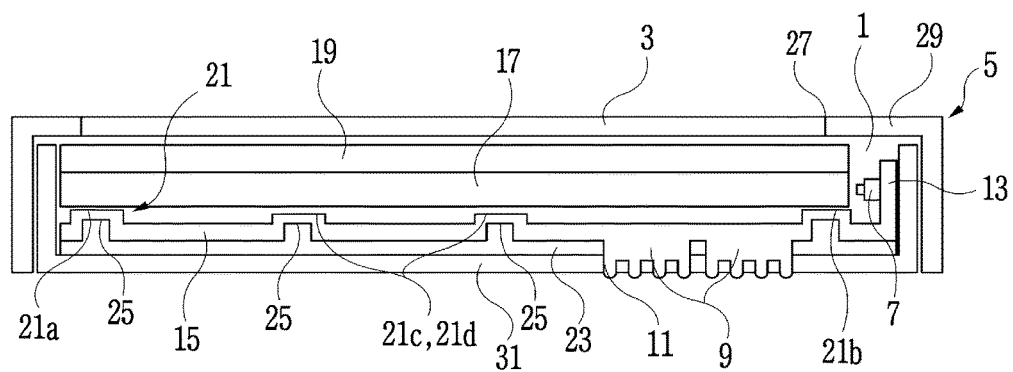
FIG. 1 is a vertical cross-sectional view of the present invention.

Hereinbelow, exemplary embodiments of the present invention will be described in detail with reference to the accompanying drawings. Throughout the drawings, the same reference numerals will refer to the same or like parts.

Figure 2:
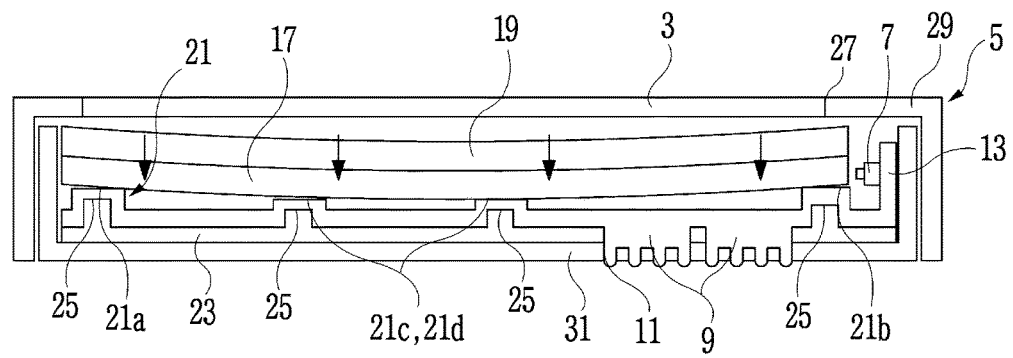
FIG. 2 is a view showing a lower surface of a horizontally extended light guide panel bent in an arc shape due to a configuration of a heat sink chassis.
Figure 3:
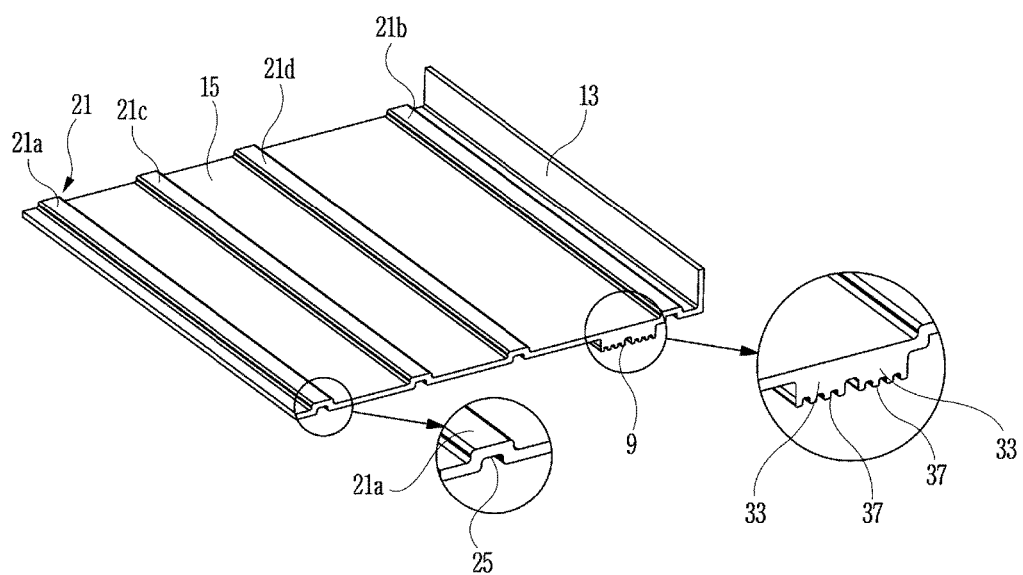
FIG. 3 is a perspective view of a base chassis provided according to the present invention.
Figure 4:
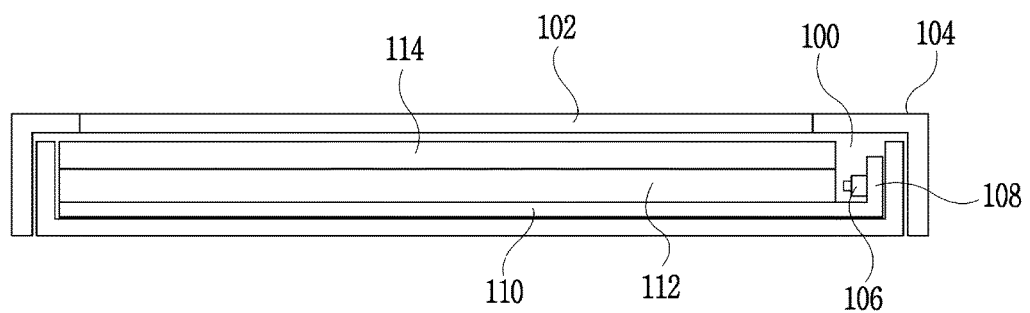
FIG. 4 is a view showing a structure of a conventional backlight unit.

According to the present invention, as shown in FIGS. 1 to 3, a heat dissipating case for a liquid crystal display panel, the heat dissipating case including: a case 5 provided with a space part 1 therein and provided with a liquid crystal panel 3 mounted to an upper surface of the case; a heat sink chassis mounting hole 11 formed through a lower surface of the case 5, wherein a heat sink chassis 9 is fitted into the heat sink chassis mounting hole, the heat sink chassis dissipating heat to an outside after absorbing the heat transferred from an LED module 7 that emits light; a base chassis 15 provided on a lower part of the space part 1 in the case 5 and dissipating the heat generated by the LED module 7 to the outside through the case 5, the base chassis 15 being provided with: an LED module attaching member 13 mounted thereto, wherein while the LED module attaching member 13 horizontally lies and vertically stands at an end thereof, a first side of the LED module attaching member 13 standing vertically is in contact with an inner side of the case 5, and the LED module 7 emitting the light is mounted on a second side of the LED module attaching member 13 standing vertically; and the heat sink chassis 9 mounted to a lower surface of the base chassis 15, wherein the heat sink chassis dissipates the heat of the LED module 7 transferred via the LED module attaching member 13 to the outside; and an upper protruding part 21 formed by protruding from an upper surface of the base chassis 15 in a direction toward an upper part of the base chassis 15, the upper protruding part 21 minimizing the quantity of the heat transferred to a light guide panel 17 from the base chassis 15 by minimizing an area in contact with the light guide panel 17 when the light guide panel 17 evenly distributing light emitted from the LED module 7 on an entire area of the liquid crystal panel 3 is provided on the base chassis 15, and an optical sheet member 19 increasing luminance in such a manner that the optical sheet member 19 evenly distributes light on an entire surface of the light guide panel 17 by diffusing the light escaping from a surface of the light guide panel 17, and refracts and condenses the light is provided on the light guide panel 17 by being laminated on the light guide panel 17, and wherein the heat generated from the LED module 7 is dissipated to the outside via the heat sink chassis 9 exposed outside the case 5, wherein the base chassis 15 dissipates the heat transferred from the LED module 7 to the outside through the case 5, and wherein the upper protruding part 21 minimizes the quantity of the heat of the LED module 7 transferred to the light guide panel 17 by minimizing the area in contact with the light guide panel 17.

As shown in FIGS. 1 and 2, a heat transfer sheet 23 is mounted between the base chassis 15 and the lower part of the space part 1 in the case 5, the heat transfer sheet 23 transferring the heat of the base chassis 15 to the case 5.

A heat dissipating sheet may be used as the heat transfer sheet 23.

In addition, as shown in FIGS. 1 to 3, a lower recessed part 25 is provided on the lower surface of the base chassis 15, the lower surface facing the upper protruding part 21, wherein the lower recessed part 25 effectively dissipates the heat of the LED module 7 transferred to the base chassis 15 in such a manner that the lower recessed part increases a heat transfer area by being formed so as to be recessed in a direction toward an inner side of the base chassis 15.

In addition, as shown in FIGS. 1 and 2, the case 5 is prevented from being swollen by the expanded light guide panel 17, and further the LED module 7 is prevented from being damaged thereby in such a manner that when the light guide panel 17 is horizontally expanded by heat transferred from the LED module 7 under a condition of high temperature and humidity of the case 5, a lower surface of the light guide panel 17 is bent into an arc shape due to height difference defined between a pair of upper protruding parts 21a, 21b arranged on a most outer part of the base chassis 15 and a pair of upper protruding parts 21c, 21d arranged on inner parts of the base chassis 15 by configuring the pair of upper protruding parts 21a, 21b so as to be arranged higher than the pair of upper protruding parts 21c, 21d.

As shown in FIGS. 1 and 2, the case 5 may include: a top chassis 29 being open-bottomed and having a parallelepiped shape, wherein the top chassis is provided with the space part 1 therein, and provided with a liquid crystal panel mounting hole 27 formed through an upper surface of the top chassis 29, the liquid crystal panel 3 being mounted to the liquid crystal panel mounting hole 27; and a bottom chassis 31 being open-topped and having the parallelepiped shape, wherein the bottom chassis is provided with the space part 1 therein, and is fitted into the top chassis 29 through an open bottom of the top chassis 29.

As shown in FIG. 3, the heat sink chassis 9 may include: a heat dissipating body 33 protruding to the outside of the case 5 from the lower surface of the base chassis 15 through the heat sink chassis mounting hole 11; and heat dissipating fins 37 increasing heat dissipating performance of the heat sink chassis 9 in such a manner that the heat dissipating fins 37 increase an area in contact with air by being extended from a lower surface of the heat dissipating body 33 in a direction toward a lower part of the heat dissipating body 33.

Meanwhile, according to a first embodiment of the present invention, the optical sheet member 19 may include: a diffuser sheet evenly distributing light on an entire surface of the liquid crystal panel 3 by diffusing the light escaping from the light guide panel 17 in such a manner that the diffuser sheet is laminated on an upper surface of the light guide panel 17; a prism sheet increasing luminance by refracting or condensing light escaping from the diffuser sheet in such a manner that the prism sheet is laminated on an upper surface of the diffuser sheet; and a complex prism sheet supplying high luminance and a wide viewing angle, and preventing impacts and scratches from the outside in such a manner that the complex prism sheet is laminated on an upper surface of the prism sheet.

In addition, according to a second embodiment of the present invention, an optical sheet member 19 may include: a prism sheet increasing luminance by refracting or condensing light escaping from a light guide panel 17 in such a manner that the prism sheet is laminated on an upper surface of the light guide panel 17; a diffuser sheet evenly distributing light on an entire surface of the prism sheet by diffusing the light escaping from the prism sheet in such a manner that the diffuser sheet is laminated on an upper surface of the prism sheet; and a complex prism sheet supplying high luminance and a wide viewing angle, and preventing impacts and scratches from the outside in such a manner that the complex prism sheet is laminated on an upper surface of the diffuser sheet.

Furthermore, a reflection sheet may be mounted on the lower surface of the light guide panel 17, the reflection sheet reflecting light escaping toward a lower part of the light guide panel 17 to the light guide panel 17.

The heat dissipating case 5 for the liquid crystal display panel having the above-mentioned configuration according to the present invention can dissipate heat of the LED module 7 transferred to the base chassis 15 or the LED module attaching member 13 to the outside via the heat sink chassis 9 exposed outside the case 5.

In addition, the heat dissipating case minimizes structure modification of the light guide panel 17 that may be caused by the heat of the LED module 7 under the condition of high temperature and humidity in the case 5 in such a manner that the heat dissipating case allows the upper protruding part 21 protruding in the direction toward the upper part of the base chassis 15 to minimize the quantity of the heat of the LED module 7 transferred to the light guide panel 17 by minimizing the area in contact with the light guide panel 17.

Furthermore, the heat dissipating case prevents the liquid crystal display from being expanded or swollen by the horizontally extended light guide panel 17, or prevents the LED module 7 from being damaged thereby in such a manner that when the light guide panel 17 is horizontally extended, a center of the lower surface of the light guide panel 17 is bent into an arc shape by configuring the pair of upper protruding parts 21a, 21b arranged on the most outer part of the base chassis 15 so as to be arranged higher than the pair of upper protruding parts 21c, 21d arranged on the inner parts of the base chassis 15.

Accordingly, the heat dissipating case 5 for the liquid crystal display panel according to the present invention can prevent other constituting parts from being expanded by the light guide panel 17 expanded due to heat transferred from the LED module 7 under the condition of high temperature and humidity in the case 5, and further can prevent the LED module 7 from being damaged by the expanded light guide panel 17.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A heat dissipating case for a liquid crystal display panel, the heat dissipating case comprising:
   a case provided with a space therein and including
      a top chassis having an open-bottom box shape,
      a liquid crystal panel mounting hole formed through an top side of the top chassis,
      a bottom chassis having an open-top box shape, and
      a heat sink mounting hole formed through a bottom side of the bottom chassis;
   a liquid crystal panel mounted to the top chassis such that the liquid crystal panel is inserted into the liquid crystal panel mounting hole of the top chassis;
   a light guide panel disposed inside the case and configured to evenly distribute light emitted from an LED module on an entire area of the liquid crystal panel;
   an optical sheet member disposed on the light guide panel and configured to diffuse, refract and condense the light escaping from a surface of the light guide panel;
   a base chassis separated from the top and bottom chassis and disposed between the bottom side of the bottom chassis and the light guide panel, the base chassis including
      an LED module attaching member on which the LED module is mounted,
      a heat sink mounted on a lower surface of the base chassis and including
         a heat dissipating body inserted into the heat sink mounting hole of the bottom chassis such that a bottom surface of the heat dissipating body is exposed outside the case, and
         heat dissipating fins formed on and protruding from the bottom surface of the heat dissipating body,
         wherein the heat sink dissipates heat generated by the LED module and transferred via the base chassis to the outside, and a plurality of protrusions formed on and protruding from an upper surface of the base chassis and configured to support the light guide panel, the protrusions including
first protrusions arranged on a most outer part of either sides of the base chassis, and
at least one second protrusion arranged on an inner part of the base chassis,
wherein a height of the first protrusions are higher than that of the second protrusion; and
a plurality of recesses formed on the lower surface of the base chassis, wherein each of the recesses is formed under corresponding one of the plurality of protrusions, respectively.

2. The heat dissipating case of claim 1, further comprising a heat transfer sheet disposed between the base chassis and the bottom chassis, the heat transfer sheet transferring the heat of the base chassis to the bottom chassis.

\* \* \* \* \*